US011902151B2

(12) United States Patent
Nagarajan et al.

(10) Patent No.: US 11,902,151 B2
(45) Date of Patent: Feb. 13, 2024

(54) RELIABLE LLD WITH LAG

(71) Applicant: ARRIS Enterprises LLC, Suwanee, GA (US)

(72) Inventors: Sabarinathan Nagarajan, Karnataka (IN); Lakshmi Arunkumar, Karnataka (IN); Ian G. Wheelock, Cork (IE)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/895,210

(22) Filed: Aug. 25, 2022

(65) Prior Publication Data

US 2023/0066589 A1   Mar. 2, 2023

Related U.S. Application Data

(60) Provisional application No. 63/239,590, filed on Sep. 1, 2021.

(51) Int. Cl.
| G06F 15/173 | (2006.01) |
| H04L 45/302 | (2022.01) |
| H04L 43/16 | (2022.01) |
| H04L 45/00 | (2022.01) |

(52) U.S. Cl.
CPC ......... *H04L 45/302* (2013.01); *H04L 43/16* (2013.01); *H04L 45/38* (2013.01)

(58) Field of Classification Search
CPC ........ H04L 45/302; H04L 43/16; H04L 45/38
USPC ........................................................ 709/238
See application file for complete search history.

(56) References Cited

U.S. PATENT DOCUMENTS

| 11,336,570 B1 * | 5/2022 | K N ................. H04L 45/42 |
| 2020/0252351 A1 * | 8/2020 | Park ................. H04L 45/18 |

OTHER PUBLICATIONS

International Search Report and the Written Opinion of the International Searching Authority dated Nov. 28, 2022 in International (PCT) Application No. PCT/US2022/041478

* cited by examiner

*Primary Examiner* — Lan Dai T Truong
(74) *Attorney, Agent, or Firm* — Wenderoth, Lind & Ponack, L.L.P.

(57) ABSTRACT

A server device for use with a cable modem, a router, a user, a client device, and a CMTS, the cable modem and the router being able to be configured in a LAG configuration, the client device and/or the cable modem being configured to provide a notification to the user to configure the cable modem and the router into the LAG configuration, the CMTS being configured to provide a first and second service flow to the cable modem, the server device comprising: a memory; and a processor configured to execute instructions stored on the memory to cause the server device to: monitor the second set of data packets; and automatically transmit a LAG notification to the client device and/or the cable modem when the second set of data packets meets a predetermined threshold, the notification notifying the user to configure the cable modem and the router into the LAG configuration.

15 Claims, 5 Drawing Sheets

RELIABLE LLD WITH LAG

BACKGROUND

Embodiments of the invention relate to low latency DOCSIS.

SUMMARY

Aspects of the present invention are drawn to a server device for use with a cable modem, a router, a user, a client device, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the client device being associated with the user, at least one of the client device and the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, the server device including: a memory; and a processor configured to execute instructions stored on the memory to cause the server device to: monitor the second set of data packets; and automatically transmit a LAG notification to the at least one of the client device and the cable modem when the second set of data packets meets a predetermined threshold, the LAG notification instructing at least one of the client device and the cable modem to provide the notification to the user to configure the cable modem and the router into the LAG configuration.

In some embodiments, the processor is configured to execute instructions stored on the memory to additionally cause the server device to query the cable modem to determine whether the cable modem can support a LAG configuration.

In some further embodiments, the processor is configured to execute instructions stored on the memory to additionally cause the server device to query the router to determine whether the router can support a LAG configuration.

In some embodiments, the processor is configured to execute instructions stored on the memory to additionally cause the server device to automatically transmit the LAG notification to the client device via the cellular network, the LAG notification instructing the client device to provide the notification to the user to configure the cable modem and the router into the LAG configuration.

In some embodiments, the processor is configured to execute instructions stored on the memory to additionally cause the server device to automatically transmit the LAG notification to the cable modem when the second set of data packets meets a predetermined threshold, the LAG notification instructing the cable modem to provide the notification to the user to configure the cable modem and the router into the LAG configuration.

Other aspects of the present disclosure are drawn to a method of using a server device with a cable modem, a router, a user, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, the method including: monitoring, via a processor configured to execute instructions stored on a memory, the second set of data packets; and automatically transmitting, via the processor, a LAG notification to the cable modem when the second set of data packets meets a predetermined threshold, the LAG notification instructing the cable modem to provide the notification to the user to configure the cable modem and the router into the LAG configuration.

In some embodiments, the method further includes querying, via the processor, the cable modem to determine whether the cable modem can support a LAG configuration.

In some further embodiments, the method further includes querying, via the processor, the router to determine whether the router can support a LAG configuration.

In some embodiments, automatically transmitting the LAG notification includes automatically transmitting the LAG notification to the client device via the cellular network, the LAG notification instructing the client device to provide the notification to the user to configure the cable modem and the router into the LAG configuration.

In some embodiments, automatically transmitting the LAG notification includes automatically transmitting the LAG notification to the cable modem when the second set of data packets meets a predetermined threshold, the LAG notification instructing the cable modem to provide the notification to the user to configure the cable modem and the router into the LAG configuration.

Other aspects of the present disclosure are drawn to a non-transitory, computer-readable media having computer-readable instructions stored thereon, the computer-readable instructions being capable of being read by a server device for use with a cable modem, a router, a user, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, wherein the computer-readable instructions are capable of instructing the server device to perform the method including: monitoring, via a processor configured to execute instructions stored on a memory, the second set of data packets; and automatically transmitting, via the processor, a LAG notification to the cable modem when the second set of data packets meets a predetermined threshold, the LAG notification instructing the cable modem to provide the notification to the user to configure the cable modem and the router into the LAG configuration.

In some embodiments, the computer-readable instructions are capable of instructing the server device to perform the method further including querying, via the processor, the cable modem to determine whether the cable modem can support a LAG configuration.

In some embodiments, the computer-readable instructions are capable of instructing the server device to perform the method further including querying, via the processor, the router to determine whether the router can support a LAG configuration.

In some embodiments, the computer-readable instructions are capable of instructing the server device to perform the method wherein the automatically transmitting the LAG notification includes automatically transmitting the LAG notification to the client device via the cellular network, the LAG notification instructing the client device to provide the notification to the user to configure the cable modem and the router into the LAG configuration.

In some embodiments, the computer-readable instructions are capable of instructing the server device to perform the method wherein the automatically transmitting the LAG notification includes automatically transmitting the LAG notification to the cable modem when the second set of data packets meets a predetermined threshold, the LAG notification instructing the cable modem to provide the notification to the user to configure the cable modem and the router into the LAG configuration.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

For some applications that require internet, a non-limiting example of which is online gaming, having low latency will drastically improve user experience. As such, users operating applications on low latency service will expect service at a higher quality than that of regular service, such as having quick responsiveness to user inputs. However, it is not uncommon for connection between the user's router and cable modem to be lost. This loss of connection between the router and cable modem will cease all network traffic until the connection is reestablished. Even when the connection between the router and cable modem still exists, some data packets may be dropped during the transfer. The downtime of the disconnection and loss of data packets will leave users disappointed. It would benefit users if there were a way for them to continue operating their network application seamlessly while the initial connection between the router and cable modem is restored.

What is needed is a system and method for notifying a user to configure their cable modem and router into (link aggregation group) LAG configuration.

A system and method in accordance with the present disclosure notifies a user to configure their cable modem and router into LAG configuration. LAG is the collection of physical Ethernet ports combined into one logical link to increase throughput and provide redundancy in case one of the links fails.

Data Over Cable Service Interface Specification (DOCSIS) is a globally recognized telecommunications standard that enables high-bandwidth data transfer via existing coaxial cable systems that were originally user in the transmission of cable television program signals. Low latency DOCSIS (LLD) has lower latency than that of DOCSIS and is a higher quality of service (QoS) service flow. In accordance with the present disclosure, a LLD controller will maintain a list of applications requiring LLD service.

A residence, which contains a cable modem and a router connected by an Ethernet line, and a client device, the client device associated with a user, will be associated with the LLD controller. All applications requiring LLD service will be have data traffic sent through a LLD service flow, while all other applications will have data traffic sent through a lower QoS service flow. When LLD data traffic meets a predetermined threshold in the residence, the LLD controller will send a LAG notification to one of the cable modem or the client device.

The user will be notified to configure the cable modem and router into LAG configuration by connecting a secondary Ethernet line to the cable modem and router. The user will then have two Ethernet lines for traffic, allowing one to still operate normally if the other were to lose connection between the cable modem and the router. This extra security ensures that the user will have optimal service and drastically decrease the chance of downtime.

An example system and method for notifying a user to configure their cable modem and router into LAG configuration in accordance with aspects of the present disclosure will now be described in greater detail with reference to FIGS. 1-3.

Figure 1:
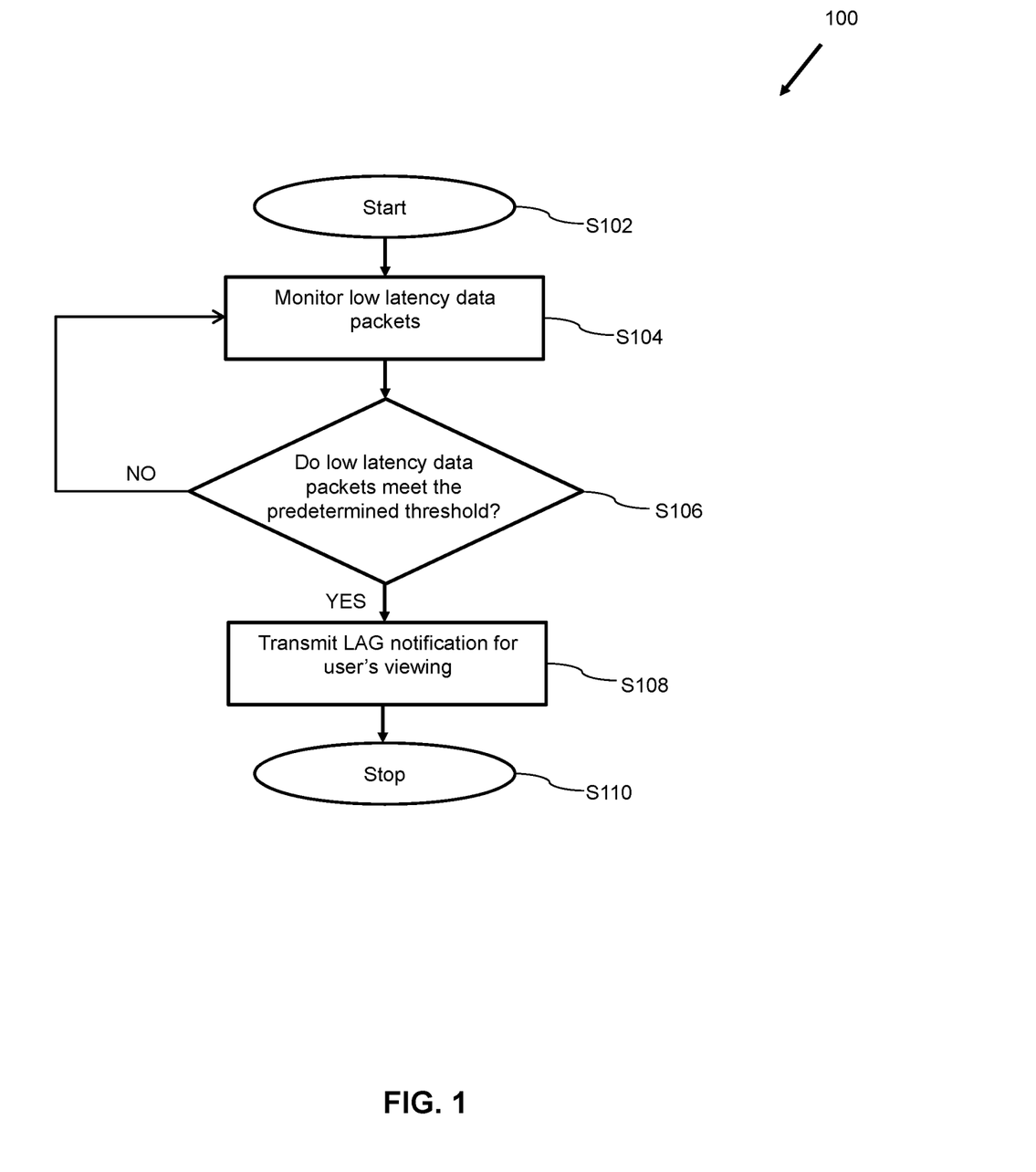
FIG. 1 illustrates an algorithm to be executed by a processor to enable a low latency DOCSIS (LLD) controller to transmit a link aggregation group (LAG) notification to a user in accordance with aspects of the present disclosure.

FIG. 1 illustrates an algorithm 100 to be executed by a processor to enable a low latency DOC SIS (LLD) controller to transmit a LAG notification to a user in accordance with aspects of the present disclosure.

As shown in FIG. 1, algorithm 100 starts (S102) and low latency data packets are monitored (S104). This will be described in greater detail with reference to FIG. 2A.

Figure 2A:
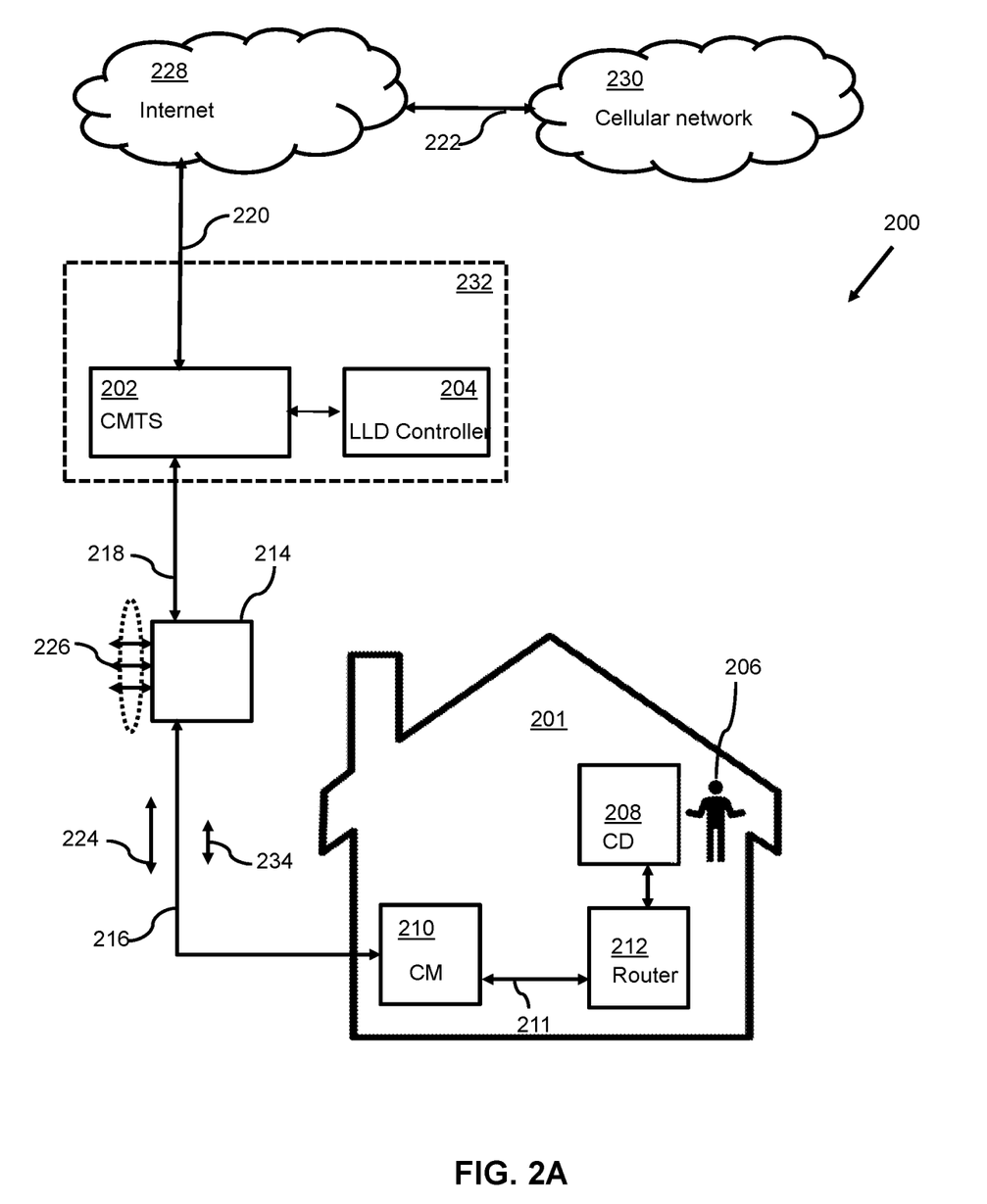
FIG. 2A illustrates a communication system at time $t_0$ in accordance with aspects of the present disclosure.

FIG. 2A illustrates a communication system 200 at time to in accordance with aspects of the present disclosure.

As shown in FIG. 2A, communication system 200 includes a residence 201, a cable modem termination system (CMTS) 202, a LLD controller 204, a user 206, a client device 208, a cable modem 210, a router 212, a network node 214, communication channels 216, 218, 220, and 222, a service flow 224, a plurality of service flows 226, an internet 228, a cellular network 230, and a LLD service flow 234. In some embodiments, CMTS 202 and LLD controller 204 are optionally combined into a unitary device, shown as CMTS/LLD controller 232.

Cable modem 210 is the gateway between CMTS 202 and residence 201.

Router 212 is an electronic device that is to be located so as to establish a local area network (LAN) at a consumer premises. The consumer premises can include a residential dwelling, office, or any other business space of a user, such as residence 201. The terms home, office, and premises may be used synonymously herein.

Router 212 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Further, it should be noted that cable modem 210 is able to communicate with CMTS 202 via communication channels 216 and 218, which may optionally be a wireless communication system, such as 4G, or 5G, and further is able to connect to internet 228.

Router 212 serves as a gateway or access point to internet 228 for one or more electronic devices, referred to generally herein as client device 208 that wirelessly communicates with cable modem 210 via, e.g., Wi-Fi. Client device 208 can be a desktop computer, laptop computer, electronic tablet device, smart phone, appliance, or any other so called internet of things equipped devices that are equipped to communicate information.

A wireless access point (WAP), or more generally just access point (AP), is a networking hardware device that allows other Wi-Fi devices to connect to a Wi-Fi network. In residence 201, router 212 is an access point.

CMTS 202 is used to provide high speed data services, e.g. cable internet.

CMTS 202 is configured to provide service flows 224 and 234 to cable modem 210 as data over cable service interface specifications (DOCSIS) service flows. DOCSIS is a globally recognized telecommunications standard that enables high-bandwidth data transfer via existing coaxial cable systems that were originally user in the transmission of cable television program signals.

For example, with reference to FIG. 2A, presume user 206 has both a music playing application and an online gaming application open on client device 208. CMTS 202 provides cable modem 210 with two service flows: service flow 224 and LLD service flow 234. As an online gaming application requires low latency, LLD service flow 234 will be reserved strictly for the online gaming application on client device 208. LLD controller 204 will monitor the low latency data packets of LLD service flow 234.

LLD controller 204 will have stored a data structure, such as a low latency look-up table (LUT), which may have a priori data stored therein, wherein the a priori data identifies server addresses that are associated with applications that may run on a client device that may benefit from low latency. Non-limiting examples of such servers include online video game servers or stock trading servers. Applications associated with these servers will be provided with LLD service flow 234 via CMTS 202, while other applications not requiring LLD service will be provided with service flow 224.

Each packet to/from cable modem 210 will have data within its packet header to identify the address of the external server from which the packet originated, when traveling in a downstream service flow to cable modem 210 (and ultimately to client device 208) or to which the packet is destined, when traveling in an upstream service flow from cable modem 210 (and originally from client device 208).

In some embodiments, if there are no low latency data packets being sent through LLD service flow 234, LLD controller 204 may discontinue LLD service flow 234, and move all data traffic to service flow 224. Discontinuing LLD service flow 234 to residence 201 will conserve resources for other residences assigned to CMTS 202 and LLD controller 204, shown as plurality of service flows 226. In some other embodiments, client device 208 would be removed from LLD service flow 234.

Returning to FIG. 1, after low latency data packets are monitored (S104), it is determined if the low latency data packets meet the predetermined threshold (S106). This will be described in greater detail with reference to FIG. 3.

Figure 3:
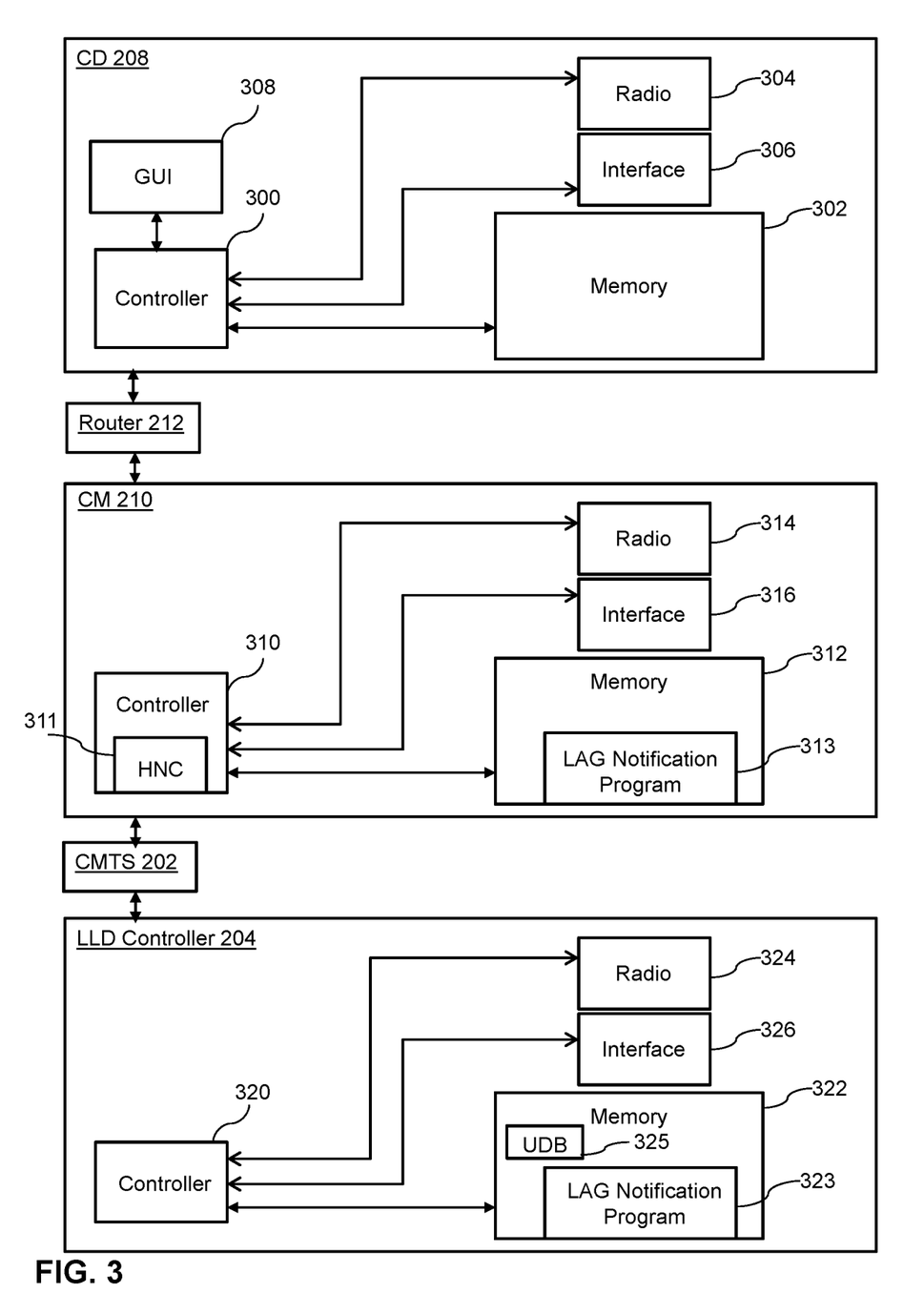
FIG. 3 illustrates an exploded view of a client device, a cable modem, and a LLD controller in accordance with aspects of the present disclosure.

FIG. 3 illustrates an exploded view of client device 208, cable modem 210, and LLD controller 204 in accordance with aspects of the present disclosure.

As shown in FIG. 3, client device 208 includes a controller 300; a memory 302, which has stored therein a LAG notification program 303; and at least one radio, a sample of which is illustrated as a radio 304; an interface 306; and a graphic user interface (GUI) 308.

In this example, controller 300, memory 302, radio 304, interface 306 and GUI 308 are illustrated as individual devices. However, in some embodiments, at least two of controller 300, memory 302, radio 304, interface 306 and GUI 308 may be combined as a unitary device. Further, in some embodiments, at least one of controller 300 and memory 302 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 300 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 208 in accordance with the embodiments described in the present disclosure.

Memory 302 can store various programming, and user content, and data.

Figure 2B:
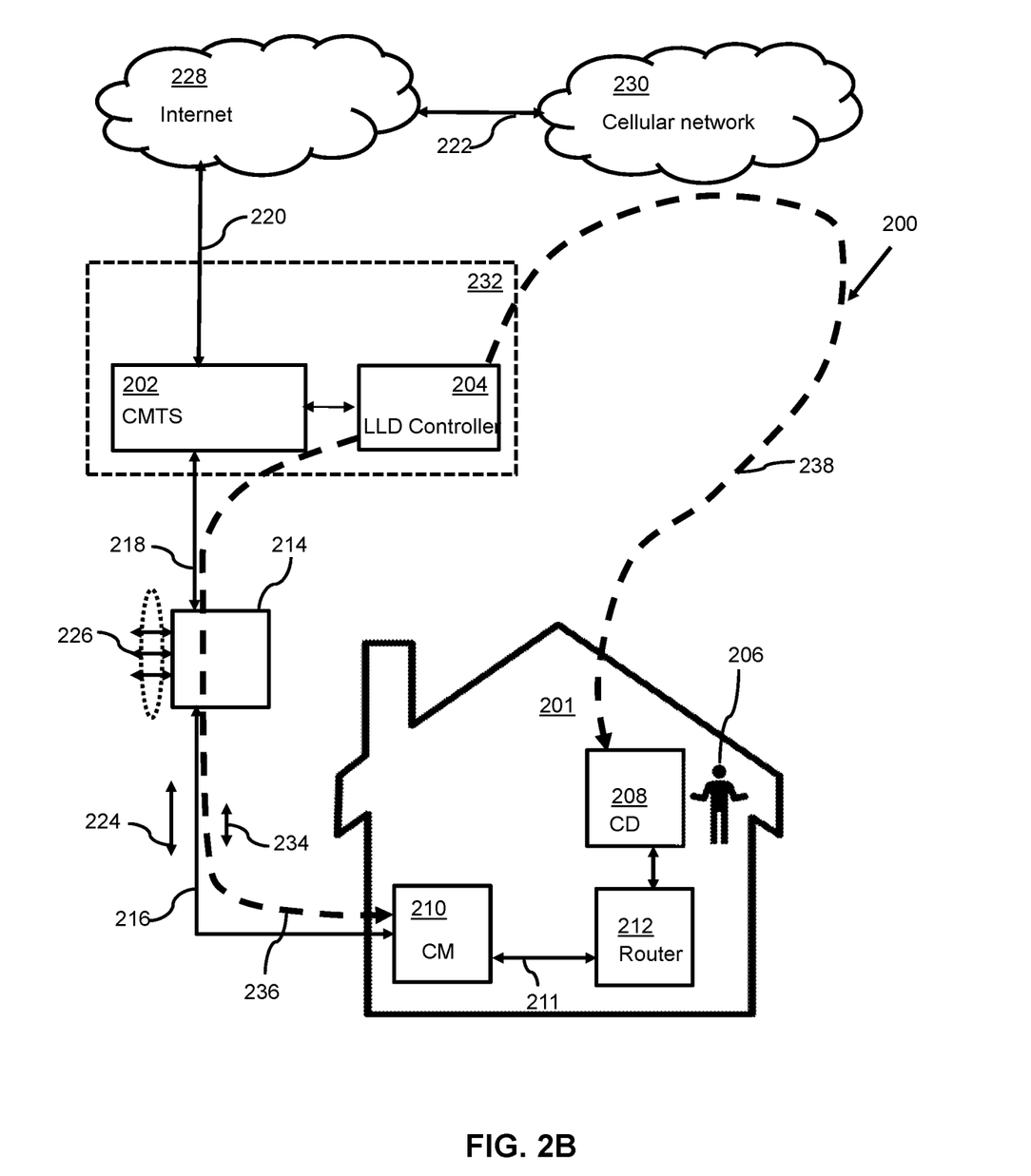
FIG. 2B illustrates a communication system at time $t_1$ in accordance with aspects of the present disclosure.
Figure 2C:
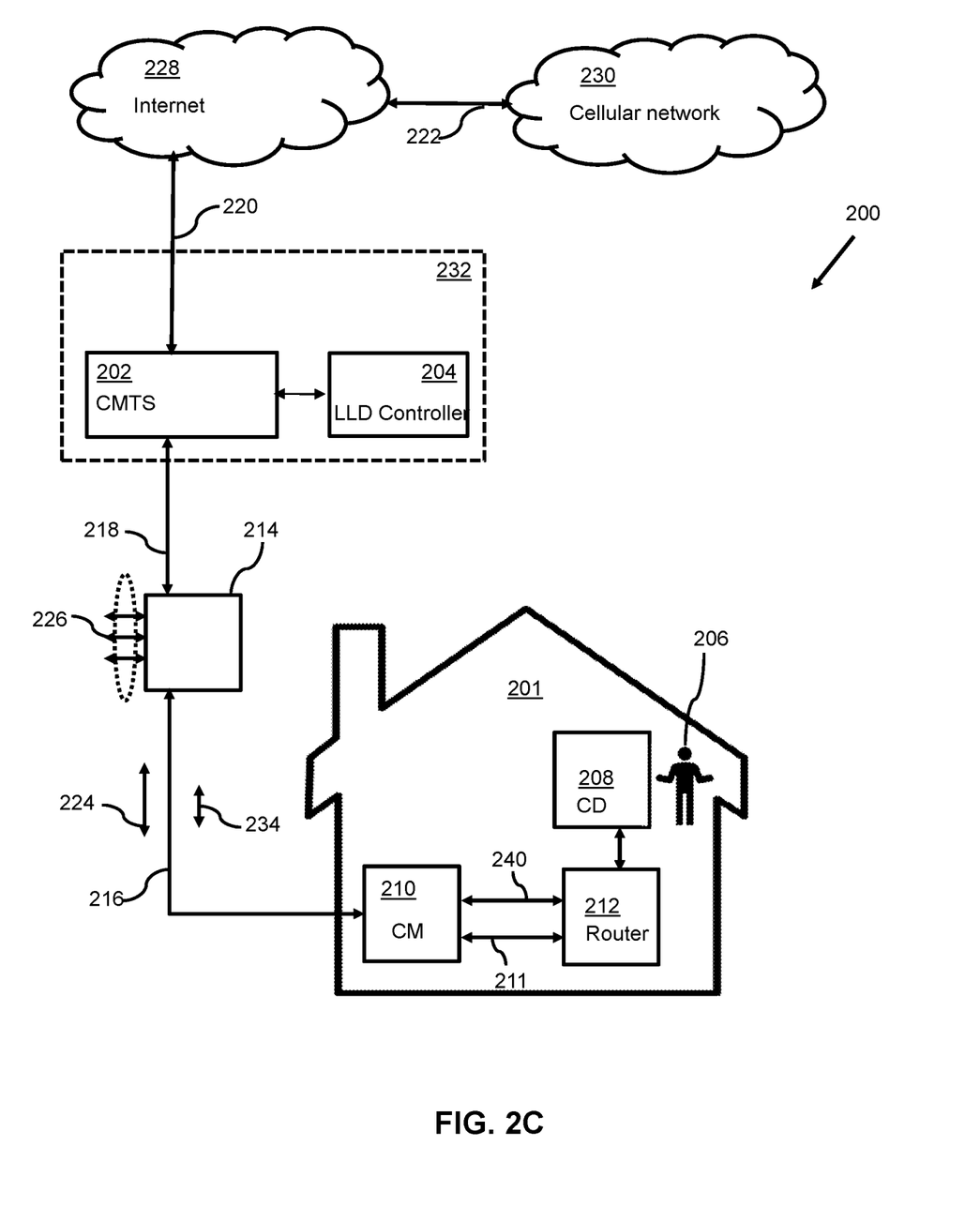
FIG. 2C illustrates a communication system at time $t_2$ in accordance with aspects of the present disclosure.

Radio 304 may include a Wi-Fi WLAN interface radio transceiver that is operable to communicate with router 212, as shown in FIGS. 2A-C and also may include a cellular transceiver operable to communicate with cellular network 230. Radio 304 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 304 may also include circuits to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 306 can include one or more connectors, such as RF connectors, or Ethernet connectors, and/or wireless communication circuitry, such as 5G circuitry and one or more antennas.

GUI 308 may be any known device or system to display an interactive image to enable a user to interact with client device 208.

As shown in FIG. 3, cable modem 210 includes a controller 310; a home network controller (HNC) 311; memory 312, which has stored therein a LAG notification program 313; at least one radio, a sample of which is illustrated as a radio 314; and an interface 316.

In this example, controller 310, memory 312, radio 314, and interface 316 are illustrated as individual devices. However, in some embodiments, at least two of controller 310, memory 312, radio 314, and interface 316 may be combined as a unitary device. Further, in some embodiments, at least one of controller 310 and memory 312 may be implemented as a computer having tangible computer-readable media for carrying or having computer-executable instructions or data structures stored thereon.

Controller 310 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of cable modem 210 in accordance with the embodiments described in the present disclosure.

Home network controller (HNC) 311 controls cable modem 210 within the wireless network. HNC 311 may perform tasks such as steering connected devices, a non-limiting example of which is a cell phone, from one access point to another.

Memory 312 can store various programming, and user content, and data, including LAG notification program 313.

As will be described in greater detail below, LAG notification program 313 includes instructions to be executed by controller 310 to cause cable modem 210 to provide a LAG notification to user 206 through client device 208.

As will be described in greater detail below, in some embodiments, LLD program 313 additionally includes instructions to be executed by controller 310 to cause cable modem 210 to provision service flow 224 and LLD service flow 234 with CMTS 202. In this sense, in some embodiments, cable modem 210 acts as provisioning system, in which cable modem 210 will request CMTS 202 to provide service for residence 201.

Radio 314, may include a Wi-Fi WLAN interface radio transceiver that is operable to communicate with router 212 and CMTS 202, as shown in FIG. 2A-C. Radio 314 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 314 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 316 can include one or more connectors, such as RF connectors, or Ethernet connectors, and/or wireless communication circuitry, such as 5G circuitry and one or more antennas. Interface 316 receives data from CMTS 202 (as shown in FIG. 2A) by known methods, non-limiting examples of which include terrestrial antenna, satellite dish, wired cable, DSL, optical fibers, or 5G as discussed above.

As shown in FIG. 3, LLD controller 204 includes a controller 320; a memory 322, which has stored therein an LLD program 323; at least one radio, a sample of which is illustrated as a radio 324; a user database 325; and an interface 326.

In this example, controller 320, memory 322, radio 324, and interface 326 are illustrated as individual devices. However, in some embodiments, at least two of controller 320, memory 322, radio 324, and interface 326 may be combined as a unitary device. Further, in some embodiments, at least one of controller 320 and memory 322 may be implemented as a computer having tangible computer-readable media for carrying or having computer-executable instructions or data structures stored thereon.

Controller 320 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of LLD controller 204 in accordance with the embodiments described in the present disclosure.

Memory 322, as will be described in greater detail below, has instructions, including LAG notification program 323, stored therein to be executed by controller 320 to allow LLD controller 204 to: monitor the second set of data packets; and automatically transmit LAG notification 236 to cable modem 210, when the second set of data packets meets a predetermined threshold, LAG notification 236 instructing cable modem 210 to provide the notification to user 206 to configure cable modem 210 and router 212 into the LAG configuration.

As will be described in greater detail below, in some embodiments, LAG notification 238 will be transmitted to client device 208 through cellular network 230, in which LAG notification 238 instructs cable modem 210 to provide the notification to user 206 to configure cable modem 210 and router 212 into the LAG configuration.

As will be described in greater detail below, in some embodiments, memory 322, as will be described in greater detail below, has additional instructions within LAG notification program 323 to be executed by controller 320 to allow LLD controller 204 to: query cable modem 210 to determine whether cable modem 210 can support a LAG configuration.

As will be described in greater detail below, in some embodiments, memory 322, as will be described in greater detail below, has additional instructions within LAG notification program 323 to be executed by controller 320 to further allow LLD controller 204 to: query router 212 to determine whether router 212 can support a LAG configuration.

As will be described in greater detail below, in some embodiments, memory 322, as will be described in greater detail below, has additional instructions within LAG notification program 323 to be executed by controller 320 to allow LLD controller 204 to: automatically transmit LAG notification 238 to client device 208 via cellular network 230, LAG notification 238 instructing client device 208 to provide the notification to user 206 to configure cable modem 210 and router 212 into the LAG configuration.

As will be described in greater detail below, in some embodiments, memory 322, as will be described in greater detail below, has additional instructions within LAG notification program 323 to be executed by controller 320 to allow LLD controller 204 to: automatically transmit LAG notification 236 to cable modem 210 when the second set of data packets meets a predetermined threshold, LAG notification 236 instructing cable modem 210 to provide the notification to user 208 to configure cable modem 210 and router 212 into the LAG configuration.

Radio 324 may include a Wi-Fi WLAN interface radio transceiver that is operable to communicate with CMTS 204 and also may include a cellular transceiver operable to communicate with cellular network 230, as shown in FIG. 2A-C. Radio 324 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 324 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

User database 325 includes registered user data associated with a registered user. For example, a person may register with CMTS 202 to receive cable service. Once registered, contact information of that person, such as the physical address, a phone number or email address, may be added to database 325. Further, each network device associated with either the person or the physical address may also be included in user database 325. For example, as shown in FIG. 2, the physical address of residence 201 may be included in user database 325. Further, identification data of cable modem 210, such as make, model, serial number and identification data of router 212 may be associated with at least one of user 206 and residence 201 and included in database 325. Further, identification data of client device 208, such as make, model, and serial number may be associated with at least one of user 206 and residence 201 and included in user database 325.

Interface 326 can include one or more connectors, such as RF connectors, or Ethernet connectors, and/or wireless communication circuitry, such as 5G circuitry and one or more antennas. Interface 326 receives data from cable modem 210 through CMTS 202 (as shown in FIG. 2A-C) by known methods, non-limiting examples of which include terrestrial antenna, satellite dish, wired cable, DSL, optical fibers, or 5G as discussed above. Through interface 326, network node 214 receives an input signal, including data and/or audio/video content, from cable modem 210 and can send data to cable modem 210.

In operation, controller 320 of LLD controller 204 will execute instructions stored on memory 322 causing LLD controller 204 to monitor low latency data packets being provided to and sent from cable modem 210. Additionally, LLD controller 204 will determine if the low latency data packets meet a predetermined threshold. Non-limiting examples of a predetermined threshold include a minimum number of running applications that require LLD service, a minimum LLD data rate value, or a single LLD packet, in combinations thereof. Further, LLD controller 204 will associate user 206 with client device 208, as in some cases there may be multiple users and client devices within a household. This association will be stored in user database 325 located within memory 322 of LLD controller 204.

Returning to FIG. 1, if the low latency data packets do not meet the predetermined threshold (N at S106), the low latency data packets continue to be monitored (return to S104). For example, presume that LLD controller 204 is configured so that the predetermined threshold is locating at least one LLD packet. However, CMTS 202 and cable modem 210 are only exchanging data through service flow 224. As such, LLD controller 204 has not monitored any low latency data packets, meaning the predetermined threshold has not been met. LLD controller 204 will continue to monitor data packets to determine if there are any low latency data packets.

Returning to FIG. 1, if the low latency data packets meet the predetermined threshold (Y at S106), a LAG notification is transmitted to the user (S108). This will be described in greater detail with reference to FIGS. 2B and 2C.

FIG. 2B illustrates communication system 200 at time $t_1$ in accordance with aspects of the present disclosure.

As shown in FIG. 2B, communication system 200 additionally includes link aggregation group (LAG) notifications 236 and 238.

In operation, for purposes of discussion only, consider the embodiment wherein LLD controller 204 is configured such that the predetermined threshold is to locate at least one LLD packet. LLD controller 204 then locates low latency data packets being supplied to and sent from cable modem 210 within LLD service flow 234, meaning the predetermined threshold has been met. With additional reference to FIG. 3, controller 320 of LLD controller 204 will execute instructions stored on memory 322 causing LLD controller 204 to transmit LAG notification 236 to cable modem 210. Controller 310 of cable modem 210 will execute instructions stored on memory 312 to cause cable modem 210 to transmit LAG notification 236, via radio 314, to router 212. Router 212 will transmit LAG notification 236 in a similar manner to radio 304 of client device 208. Controller 300 of client device 208 will execute instructions stored on memory 302 to cause client device 208 to display a message on GUI 308 alerting user 206 to configure cable modem 210 and router 212 into LAG configuration.

In some embodiments, controller 320 of LLD controller 204 will execute instructions stored on memory 322 causing LLD controller 204 to transmit LAG notification 238 directly to client device 208 via cellular network 230.

In some embodiments, LLD controller 204 is able to determine whether cable modem 210 is able to be configured in a LAG configuration. For example, in some embodiments, controller 320 of LLD controller 204 may execute instructions stored on memory 322 to cause LLD controller 204 to query cable modem 210 to determine whether cable modem 210 is able to support LAG configuration. This operation may be performed by any known protocol, a non-limiting example of which includes using a TR-069 protocol. Upon receiving the query, controller 310 of cable modem controller 310 may execute instructions stored on LAG notification program 313 to cause controller 310 to transmit a response to LLD controller 204 indicating whether cable modem 210 is able to support a LAG configuration. In these embodiments, if LLD controller 204 determines that cable modem 210 is unable to support a LAG configuration, then algorithm 100 would then stop.

Additionally, LLD controller 204 may also query router 212 to determine whether router 212 can support LAG configuration. For example, in some embodiments, controller 320 of LLD controller 204 may execute instructions stored on memory 322 to cause LLD controller 204 to instruct cable modem 210 to query router 212 to determine whether router 212 is able to support LAG configuration. This operation may be performed by any known protocol, a non-limiting example of which includes using a TR-069 protocol. Upon receiving the instruction, controller 310 of cable modem controller 310 may execute instructions stored on LAG notification program 313 to cause controller 310 to transmit a query to router 212. Upon receiving the query, router 212 may transmit a response to controller 310 of cable modem 210 indicating whether router 212 is able to support a LAG configuration. Upon receiving the response, controller 310 of cable modem controller 310 may execute instructions stored on LAG notification program 313 to cause controller 310 to transmit the response to LLD controller 204 indicating whether router 212 is able to support a LAG configuration. In these embodiments, if LLD controller 204 determines that router 212 is unable to support a LAG configuration, then algorithm 100 would then stop.

Still further, in some embodiments, LLD controller 204 may query both cable modem 210 and router 212 to determine whether both are able to support a LAG configuration using a combination of processes discussed above.

FIG. 2C illustrates a communication system 200 at time $t_2$ in accordance with aspects of the present disclosure. FIG. 2C differs from FIG. 2A in that in FIG. 2C, at time $t_2$, another Ethernet line 240 is connected between cable modem 210 and router 212.

Cable modem 210 and router 212 have two Ethernet ports each. As shown through FIGS. 2A-C, cable modem 210 and router 212 are connected via Ethernet line 211. However, as shown in FIG. 2C, Ethernet line 240 is also connecting cable modem 210 and router 212 when cable modem 210 and router 212 are configured in LAG configuration.

For example, with reference to FIG. 2C, consider the situation wherein user 206 has been alerted by the notification displayed on GUI 308 of client device 208. The notification instructed user 206 to configure cable modem 210 and router 212 for LAG configuration. User 206 will configure cable modem 210 and router 212 for LAG configuration by plugging in Ethernet line 240 into the empty Ethernet ports of cable modem 210 and router 212.

Returning to FIG. 1, after a LAG notification is transmitted to the user (S108), algorithm 100 stops (S110).

Users operating applications on low latency service will expect quick download and upload speeds with minimal downtime. However, connection between the user's router and cable modem may be lost. This loss of connection between the router and cable modem will cease all network traffic until the connection is reestablished. Even when the connection between the router and cable modem still exists, some data packets may be dropped. The downtime of the disconnection and lost data packets will leave users disappointed.

In accordance with the present disclosure, a LLD controller will monitor data packets and determine if any low latency data packets meet a predetermined threshold. Once the low latency data packets meet the predetermined threshold, a LAG notification is sent to one of a cable modem or a client device associated with a user. The user will be notified to configure their cable modem and a router into LAG configuration. The user will then physically attach a second Ethernet line between both the cable modem and router.

Thus, the present disclosure as disclosed notifies a user to configure their cable modem and router into LAG configuration to ensure more consistent, quality service.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A server device for use with a cable modem, a router, a user, a client device, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the client device being associated with the user, at least one of the client device and the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, said server device comprising:
a memory; and
a processor configured to execute instructions stored on said memory to cause said server device to:
monitor the second set of data packets; and
automatically transmit a LAG notification to the at least one of the client device and the cable modem when the second set of data packets meets a predetermined threshold, the LAG notification instructing the at least one of the client device and the cable modem to provide the notification to the user to configure the cable modem and the router into the LAG configuration.

2. The server device of claim 1, wherein said processor is configured to execute instructions stored on said memory to additionally cause said server device to query the cable modem to determine whether the cable modem can support a LAG configuration.

3. The server device of claim 2, wherein said processor is configured to execute instructions stored on said memory to additionally cause said server device to query the router to determine whether the router can support a LAG configuration.

4. The server device of claim 1, for additional use with a cellular network, the client device being connected to the cellular network, wherein said processor is configured to execute instructions stored on said memory to additionally cause said server device to automatically transmit the LAG notification to the client device via the cellular network, the LAG notification instructing the client device to provide the notification to the user to configure the cable modem and the router into the LAG configuration.

5. The server device of claim 1, wherein said processor is configured to execute instructions stored on said memory to additionally cause said server device to automatically transmit the LAG notification to the cable modem when the second set of data packets meets a predetermined threshold, the LAG notification instructing the cable modem to provide the notification to the user to configure the cable modem and the router into the LAG configuration.

6. A method of using a server device with a cable modem, a router, a user, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, said method comprising:
monitoring, via a processor configured to execute instructions stored on a memory, the second set of data packets; and
automatically transmitting, via the processor, a LAG notification to the cable modem when the second set of data packets meets a predetermined threshold, the LAG notification instructing the cable modem to provide the notification to the user to configure the cable modem and the router into the LAG configuration.

7. The method of claim 6, further comprising querying, via the processor, the cable modem to determine whether the cable modem can support a LAG configuration.

8. The method of claim 7, further comprising querying, via the processor, the router to determine whether the router can support a LAG configuration.

9. The method of claim 6, for additional use with a cellular network, a client device being connected to the cellular network, wherein said automatically transmitting the LAG notification comprises automatically transmitting the LAG notification to the client device via the cellular network, the LAG notification instructing the client device to provide the notification to the user to configure the cable modem and the router into the LAG configuration.

10. The method of claim 6, wherein said automatically transmitting the LAG notification comprises automatically transmitting the LAG notification to the cable modem when the second set of data packets meets a predetermined threshold, the LAG notification instructing the cable modem to provide the notification to the user to configure the cable modem and the router into the LAG configuration.

11. A non-transitory, computer-readable media having computer-readable instructions stored thereon, the computer-readable instructions being capable of being read by server device for use with a cable modem, a router, a user, and a cable modem termination system ("CMTS"), the router being configured to provide to the cable modem a first set of data packets for a non-negative integer number n applications and to provide a second set of data packets for a non-negative integer number m applications, the n applications requiring respective data traffic of a first quality of service ("QoS"), the m applications requiring respective data traffic of a second QoS, the second QoS being higher than the first QoS, the cable modem and the router being able to be configured in a link aggregation group (LAG) configuration, the cable modem being configured to provide a notification to the user to configure the cable modem and the router into the LAG configuration, the CMTS being configured to provide a first service flow to the cable modem and to provide a second service flow to the cable modem, the first service flow being associated with the first QoS, the second service flow being associated with the second QoS, wherein the computer-readable instructions are capable of instructing the server device to perform a method comprising:

monitoring, via a processor configured to execute instructions stored on a memory, the second set of data packets; and automatically transmitting, via the processor, a LAG notification to the cable modem when the second set of data packets meets a predetermined threshold, the LAG notification instructing the cable modem to provide the notification to the user to configure the cable modem and the router into the LAG configuration.

12. The non-transitory, computer-readable media claim 11, wherein the computer-readable instructions are capable of instructing the server device to perform the method further comprising querying, via the processor, the cable modem to determine whether the cable modem can support a LAG configuration.

13. The non-transitory, computer-readable media claim 12, wherein the computer-readable instructions are capable of instructing the server device to perform the method further comprising querying, via the processor, the router to determine whether the router can support a LAG configuration.

14. The non-transitory, computer-readable media claim 11, for additional use with a cellular network, a client device being connected to the cellular network, wherein the computer-readable instructions are capable of instructing the server device to perform the method wherein said automatically transmitting the LAG notification comprises automatically transmitting the LAG notification to the client device via the cellular network, the LAG notification instructing the client device to provide the notification to the user to configure the cable modem and the router into the LAG configuration.

15. The non-transitory, computer-readable media claim 11, wherein the computer-readable instructions are capable of instructing the server device to perform the method wherein said automatically transmitting the LAG notification comprises automatically transmitting the LAG notification to the cable modem when the second set of data packets meets a predetermined threshold, the LAG notification instructing the cable modem to provide the notification to the user to configure the cable modem and the router into the LAG configuration.

* * * * *